June 10, 1958 M. MAY 2,837,785
SNAP-IN GLASS SETTING CONSTRUCTION
Filed July 21, 1955
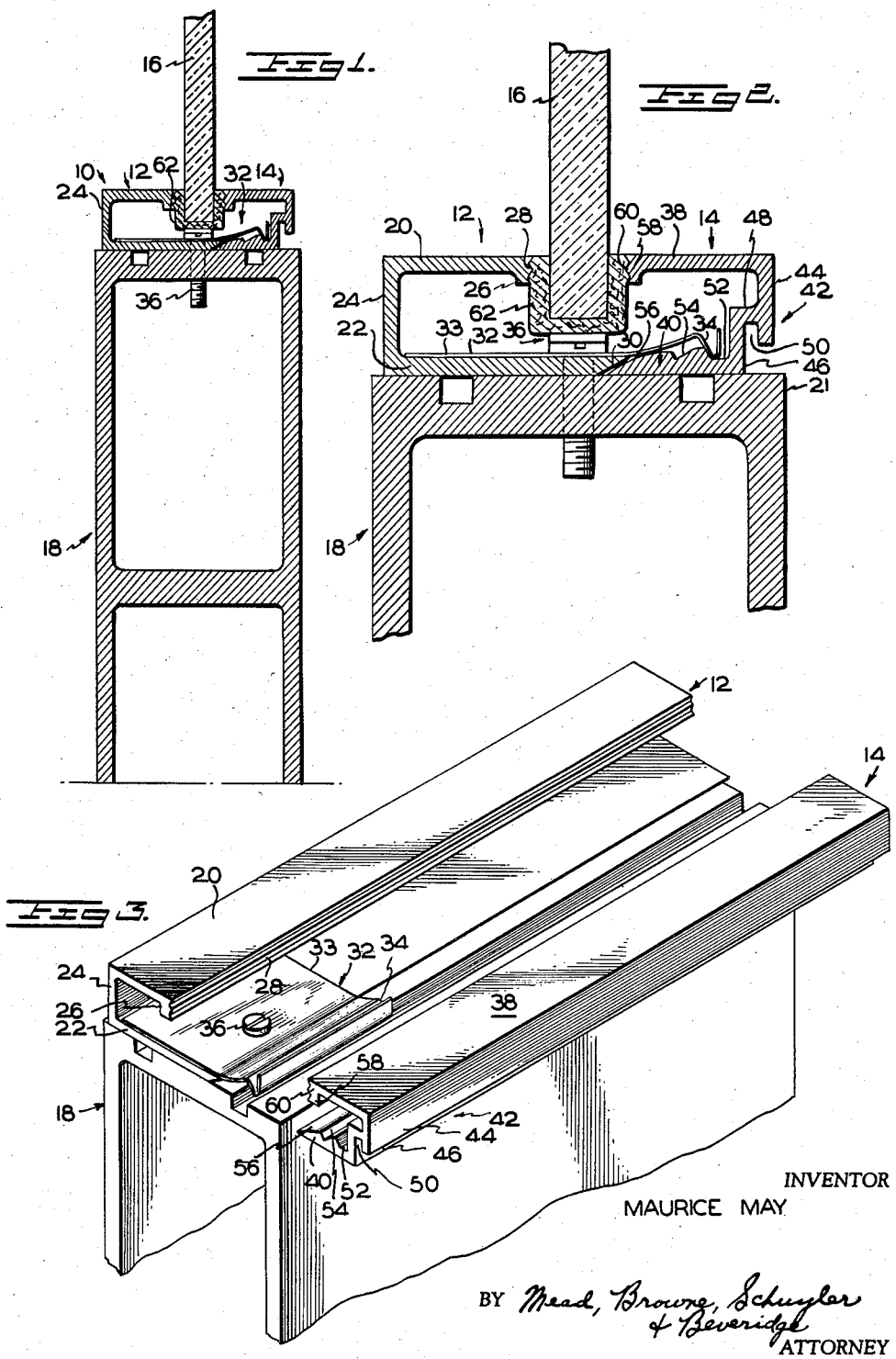
INVENTOR
MAURICE MAY
ATTORNEY

United States Patent Office 2,837,785
Patented June 10, 1958

2,837,785

SNAP-IN GLASS SETTING CONSTRUCTION

Maurice May, Atlanta, Ga., assignor to American Art Metals Company, Atlanta, Ga., a corporation of Delaware Application July 21, 1955, Serial No. 523,442

2 Claims. (Cl. 20—56.4)

This invention relates to glass setting and more particularly to the setting of sheet glass for windows, store fronts and the like.

It is an object of this invention to provide a glass setting using metal stops in which the stop members on opposite sides of the sheet of glass are quickly and easily assembled with respect to each other to permit easy and rapid installation of the glass.

It is a further object of this invention to provide a glass setting for windows, store fronts and the like using metal stops in which at least one of the stops may be removed and reused without deforming or marring the stop or any contiguous or collateral surfaces.

It is still a further object of this invention to provide a glass setting in which the glass is securely held in a cushioned and weatherproof setting.

It is still a further object of this invention to provide a glass setting using metal stops in which the glass may be easily removed by removal of one of the stop members.

Further objects and advantages of the invention will become apparent from the following description taken in conjunction with the accompanying drawing in which:

Fig. 1 is a vertical elevation view, partially broken away, of a glass setting in accordance with the invention;

Fig. 2 is an enlarged fragmentary view of the upper portion of Fig. 1; and

Fig. 3 is a perspective view of the metal stops used in the glass setting of Figs. 1 and 2 showing the metal stop members removed from each other.

Referring now to the drawings, the glass setting device of the invention is generally indicated at 10 and includes a pair of stop members generally indicated at 12 and 14 disposed on opposite sides of the sheet of glass 16. Stop members 12 and 14 are supported on the upper surface of a structural member generally indicated at 18 which forms a part of the window or store front structure. Stop members 12, 14 and support member 18 are preferably made of a metal such as extruded aluminum. While stop members 12 and 14 will be described as lying in a horizontal plane on the upper surface of member 18, it will be understood that stop members 12, 14 and member 18 may be oriented in other planes. For example, all of these members may lie in vertical planes, in which case stop members 12, 14 would lie along the vertical side edge of glass sheet 16.

As will best be seen in the enlarged view of Fig. 2, member 12 includes a horizontal upper flange portion 20 and a lower flange or base portion 22 which are connected together at their left-hand or outer edge by a vertical web portion 24. Flange portion 20 and base portion 22 lie in substantially parallel planes. The lower surface of base portion 22 rests directly in the upper surface of structural member 18. The right-hand edge of flange portion 20 facing glass sheet 16 terminates in a short vertical glass-securing lip 26 extending laterally toward base portion 22 and having serrations 28 on its vertical surface which faces glass sheet 16. Base portion 22 of stop member 12 extends beyond the center line of the width of the upper surface of structural member 18 and terminates in a beveled edge 30.

Disposed on the upper surface of base portion 22 of member 12 and located at spaced intervals thereon are retaining spring clips generally indicated at 32. Each spring clip 32 includes a flat portion 33 which is in direct contact with the upper surface of base portion 22 of fixed stop member 12 and which extends beyond base portion 22 to terminate in a V-shaped lip portion 34. Each spring clip 32 is securely fastened to the base portion 22 by a screw member 36 which passes through flat portion 33 of the spring. Screw 36 also serves to rigidly secure member 12 to the structural member 18.

Stop member 14 is detachable with respect to stop member 12 and with respect to support member 18. Member 14 includes an upper flange portion 38 extending inwardly toward glass sheet 16 and a base portion generally indicated at 40 which lies in a plane substantially parallel to flange portion 38. The edge of flange portion 38 facing glass sheet 16 is provided with a glass-securing lip 58 having serrations 60 similar respectively to lip 26 and serrations 28 of stop member 12. The respective flange portions 20 and 38 of stop members 12 and 14 are spaced from each other by a distance sufficient to accommodate a glass-holding channel member to be later described.

Upper flange portion 38 and base portion 40 are connected to each other by a web portion generally indicated at 42 including an upper web portion 44 and a lower web portion 46 connected to each other by a laterally extending connecting portion 48. Upper web portion 44 extends below the bottom level of connecting portion 48 to define a key slot 50 which is used in connection with a tool used in removing stop member 14 when desired as will be explained more fully hereinafter.

The edge of base portion 40 facing base portion 32 of stop member 12 is beveled as shown at 56 and has a bevel which extends substantially parallel to the bevel 30 of base portion 22 of stop member 12. The upper surface of base portion 40 of removable stop member 14 is provided at its end adjacent the inner surface of lower web portion 46 with a flat-bottomed longitudinally extending groove 52 adapted to receive the V-shaped portion 34 of clip member 32 as shown in Fig. 2. A second groove 54 is spaced from groove 52 by a distance equal to approximately one-fourth of the width of base portion 40 in the direction of beveled edge 56 to serve as a secondary retaining means for lip portion 34 of clip 32 in the event that lip portion 34 should become separated from groove 52 due to vibration or other cause.

When stops 12 and 14 are used for holding a sheet of glass as shown in Figs. 1 and 2, the fixed stop 12 is first attached by means of screws 36 to the upper surface of structural member 18, screws 36 also serving to retain spring clips 32 in position. A continuous plastic channel 62 is then positioned around the lower edge of glass sheet 16; and the glass sheet, with channel 62 in position, is set in place with the left-hand or outer edge of channel 62 in engagement with the lip 26 of member 12 and with the bottom or base portion of channel 62 resting on the upper surfaces of screws 36. Movable stop member 14 is then pushed into position until lip portions 34 of spring clips 32 engage the flat-bottomed groove 52 as shown in Figs 1 and 2. The beveled edges 30 and 56 of the respective stop members 12 and 14 will then be in closely adjacent relation and the upper edges of channel 62 will be securely gripped by serrations 28 and 60 of lip portions 26 and 58, respectively. The pressure exerted by serrations 28 and 60 on channel 62 will cause the channel in turn to firmly grip glass pane 16 in such manner as to make a cushioned and weatherproof setting.

The removable stop member 14 may be easily removed by inserting a lever into the key slot 50 to pry member 14 out of engagement with spring clips 32. One tool which may be used for this purpose includes a lip member which fits into the key slot 50, the lip member being pivotally attached to a lever arm which fulcrums about the side edge portion 21 of member 18. When force is exerted on the lever arm, member 14 is moved out of engagement with clips 32.

It can be seen from the foregoing that the use of the glass setting stops 12 and 14 hereinbefore described permit the sheet of glass to be easily and quickly installed, with the removable stop member 14 being easily snapped into position to rigidly secure glass sheet 16 in position. The use of the spring clips cooperating with the removable stop member permits the removable stop member to be easily installed or removed as desired, thereby permitting easy installation or removal of the glass sheet. Furthermore, the easily detachable connection of removable stop member 14 to fixed stop member 12 permits the removable stop member to be removed without deforming or marring the removable stop or any contiguous or collateral surfaces.

While there has been shown and described a particular embodiment of the invention, it will be obvious to those skilled in the art that various changes and modifications can be made therein without departing from the invention and, therefore, it is aimed to cover all such changes and modifications as fall within the true spirit and scope of the invention.

What I claim as my invention is:

1. A glass setting assembly comprising a first stop member having an upper and a lower planar flange portion connected along their outer longitudinal edges by a web portion, said lower flange terminating in a beveled, undercut lip, a spring clip secured upon said lower flange portion and projecting beyond the inner longitudinal edge thereof to a downwardly biased lip, a second stop member including an upper and a lower flange portion connected along their outer longitudinal edges by a web portion, the inner longitudinal edge of the last-mentioned lower flange being beveled upwardly toward the last-mentioned web, to define a beveled lip parallel to said first stop lip, and said last-mentioned lower flange having a groove receiving said spring clip lip for locating and resiliently securing said stop members in predetermined relation with each other upon a support wherein the inner longitudinal edges of the upper flange portions of said first and said second stop members are in opposed facing relation with each other and spaced from each other a distance sufficient to receive a sheet of glass therebetween, the lip of said second member facilitating the entry of said spring clip lip into engagement with said lower flange groove, and the parallel lips on said first and second members accommodating accurate juxtapositioning of said members.

2. A glass setting assembly as defined in claim 1, wherein said first stop member is fixedly secured to said support, the web portion of said second stop member having a key slot in the outer surface thereof for facilitating the separation of said second stop member from assembled relationship with said first stop member.

References Cited in the file of this patent
UNITED STATES PATENTS

| | | |
|---|---|---|
| 2,177,037 | Haskel | Oct. 24, 1939 |
| 2,620,905 | Hallauer | Dec. 9, 1952 |